(12) United States Patent
Dwelly et al.

(10) Patent No.: US 6,970,128 B1
(45) Date of Patent: Nov. 29, 2005

(54) MOTION COMPENSATED SYNTHETIC APERTURE IMAGING SYSTEM AND METHODS FOR IMAGING

(75) Inventors: Wesley H. Dwelly, Sahuarita, AZ (US); Vinh N. Adams, Tucson, AZ (US); Michael R. Beylor, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/959,794

(22) Filed: Oct. 6, 2004

(51) Int. Cl.[7] .............................................. G01S 13/90
(52) U.S. Cl. ................ 342/25 F; 342/25 R; 342/25 A; 342/59; 342/89; 342/90; 342/175; 342/176; 342/179; 342/195; 342/196; 342/357.01; 342/357.06
(58) Field of Search ............................... 342/22, 25 R, 342/25 A–25 F, 27, 28, 59, 175, 176, 179, 342/191–197, 357.01–357.17, 89, 90, 128–147, 342/450–465

(56) References Cited

U.S. PATENT DOCUMENTS

| | | | |
|---|---|---|---|
| 5,327,140 A | * | 7/1994 | Buckreu.beta. ........... 342/25 R |
| 5,659,318 A | * | 8/1997 | Madsen et al. ........... 342/25 R |
| 5,708,436 A | * | 1/1998 | Loiz et al. ................ 342/25 R |
| 5,777,573 A | * | 7/1998 | Klausing et al. .......... 342/25 R |
| 5,949,364 A | * | 9/1999 | Katzberg et al. .......... 342/25 R |
| 6,037,893 A | * | 3/2000 | Lipman .................... 342/25 R |

* cited by examiner

*Primary Examiner*—Bernarr E. Gregory
(74) *Attorney, Agent, or Firm*—Thomas J. Finn; Leonard A. Alkov; Karl A. Vick

(57) ABSTRACT

A see-through-the-wall (STTW) imaging system uses a plurality of geographically separated positioning transmitters to transmit non-interfering positioning signals. An imaging unit generates a synthetic aperture image of a target by compensating for complex movement of the imaging unit using the positioning signals. The imaging unit includes forward and aft positioning antennas to receive at least three of the positioning signals, an imaging antenna to receive radar return signals from the target, and a signal processor to compensate the return signals for position and orientation of the imaging antenna using the positioning signals. The signal processor may construct the synthetic aperture image of a target from the compensated return signals as the imaging unit is moved with respect to the target. The signal processor may determine the position and the orientation of the imaging unit by measuring a relative phase of the positioning signals.

33 Claims, 5 Drawing Sheets

MOTION COMPENSATED SYNTHETIC APERTURE IMAGING SYSTEM AND METHODS FOR IMAGING

TECHNICAL FIELD

The present invention pertains to imaging systems. Some embodiments of the preset invention pertain to synthetic aperture radar (SAR) systems and some embodiments pertain to spotlight SAR systems.

BACKGROUND

Conventional synthetic aperture radar (SAR) systems generate an effectively long antenna by signal processing rather than actually using a long physical antenna. In a conventional SAR system, radar signals are transmitted and return signals are received with a relatively small physical antenna as the antenna travels in a straight line and at a near constant velocity. SAR systems generate higher-resolution images because they are not limited by their antenna beamwidth.

Conventional SAR systems are generally not suitable for human-held or vehicular mounted uses because the motion of the radar/imaging unit is unpredictable and difficult to measure. Because SAR is difficult to use for these ground based radar systems, the resolution of such systems is generally limited by a small antenna's physical beamwidth. Another problem with some ground-based SAR systems is that they work only at close range. This may present safety problems among other difficulties.

Thus, there are general needs for synthetic aperture imaging systems and methods that compensate for complex motion of persons or vehicles. There are also general needs for synthetic aperture imaging systems and methods that can generate images of targets through obstacles. There are also general needs for synthetic aperture imaging systems and methods that compensate for complex motion and can detect, locate and classify an image behind an obstacle. There are also general needs for synthetic aperture imaging systems and methods that generate synthetic aperture images at greater ranges.

SUMMARY

A see-through-the-wall (STTW) imaging system receives non-interfering positioning signals from a plurality of geographically separated positioning transmitters. An imaging unit generates a synthetic aperture image of a target by compensating for complex movement of the imaging unit using the positioning signals. The imaging unit includes forward and aft positioning antennas to receive at least three of the positioning signals, an imaging antenna to receive radar return signals from the target, and a signal processor to compensate the return signals for position and orientation of the imaging antenna based on the positioning signals. The signal processor may construct the synthetic aperture image from the compensated return signals as the unit is moved with respect to the target. In some embodiments, the imaging antenna transmits and receives one or more radar frequencies selected to allow the signal processor to generate an image of a target through an obstacle. The signal processor may determine the position and the orientation of the unit by measuring a relative phase of the positioning signals received by the forward and aft antennas as the imaging unit is moved with respect to the target. In some embodiments, the positioning signals are generated by corresponding positioning transmitters that are separated in azimuth. At least one of the positioning transmitters may be separated in elevation.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to voluntarily limit the scope of this application to any single invention or inventive concept if more than one is in fact disclosed.

Figure 1:
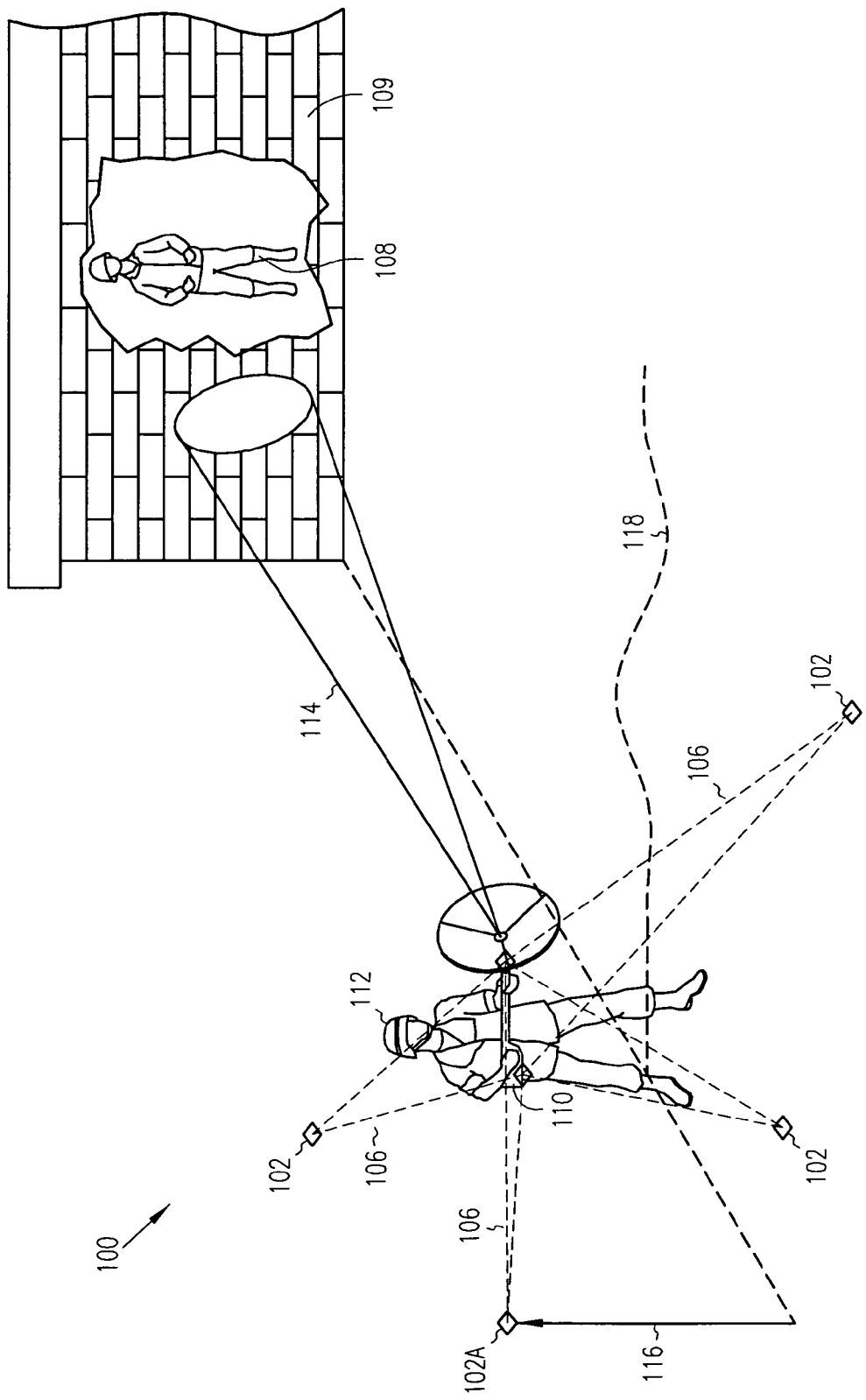
FIG. 1 illustrates an operational environment of an imaging system in accordance with some embodiments of the present invention.

FIG. 1 illustrates an operational environment of an imaging system in accordance with some embodiments of the present invention. Imaging system 100 may include a plurality of positioning transmitters 102 to transmit non-interfering positioning signals 106, and imaging unit 110 to generate a synthetic aperture image of target 108. Imaging unit 110 receives positioning signals 106 and compensates for possibly complex movement of imaging unit 110 based on the positioning signals 106.

Imaging unit 110 may comprise forward and aft positioning antennas to receive at least three positioning signals 106 from different geographic locations, and a signal processor to compensate return signals 114 for position and orientation of an imaging antenna based on positioning signals 106. In some embodiments, imaging unit 110 may be portable, movable or human-held, while in other embodiments, imaging unit 110 may be vehicle mounted. In some embodiments, imaging system 100 may be a see-through-the-wall (STTW) imaging system which may generate an image of target 108 through obstacle 109 using synthetic aperture radar (SAR) techniques, although the scope of the invention is not limited in this respect.

In some embodiments, the movement of imaging unit 110 over path 118 may be complex. In other words, imaging unit 110 may not necessarily move in a straight line or have a fixed orientation. A conventional SAR, on the other hand, does not have to deal with complex motion because the SAR antenna of a conventional SAR system travels in a straight line and at a near-constant velocity when imaging. In accordance with embodiments of the present invention, imaging unit 110 may be carried by user 112 (e.g., soldier) that may be walking, taking cover, or moving sporadically. During this time, imaging unit 110 may perform synthetic aperture imaging compensating for the complex motion of user 112. Imaging unit 110 may also be carried on a vehicle that may change speed and go over rough terrain causing the orientation and position of an imaging antenna to vary unpredictably. In some embodiments, imaging unit 110 may be carried on an unmanned aerial vehicle (UAV), although the scope of the invention is not limited in this respect.

Figure 2:
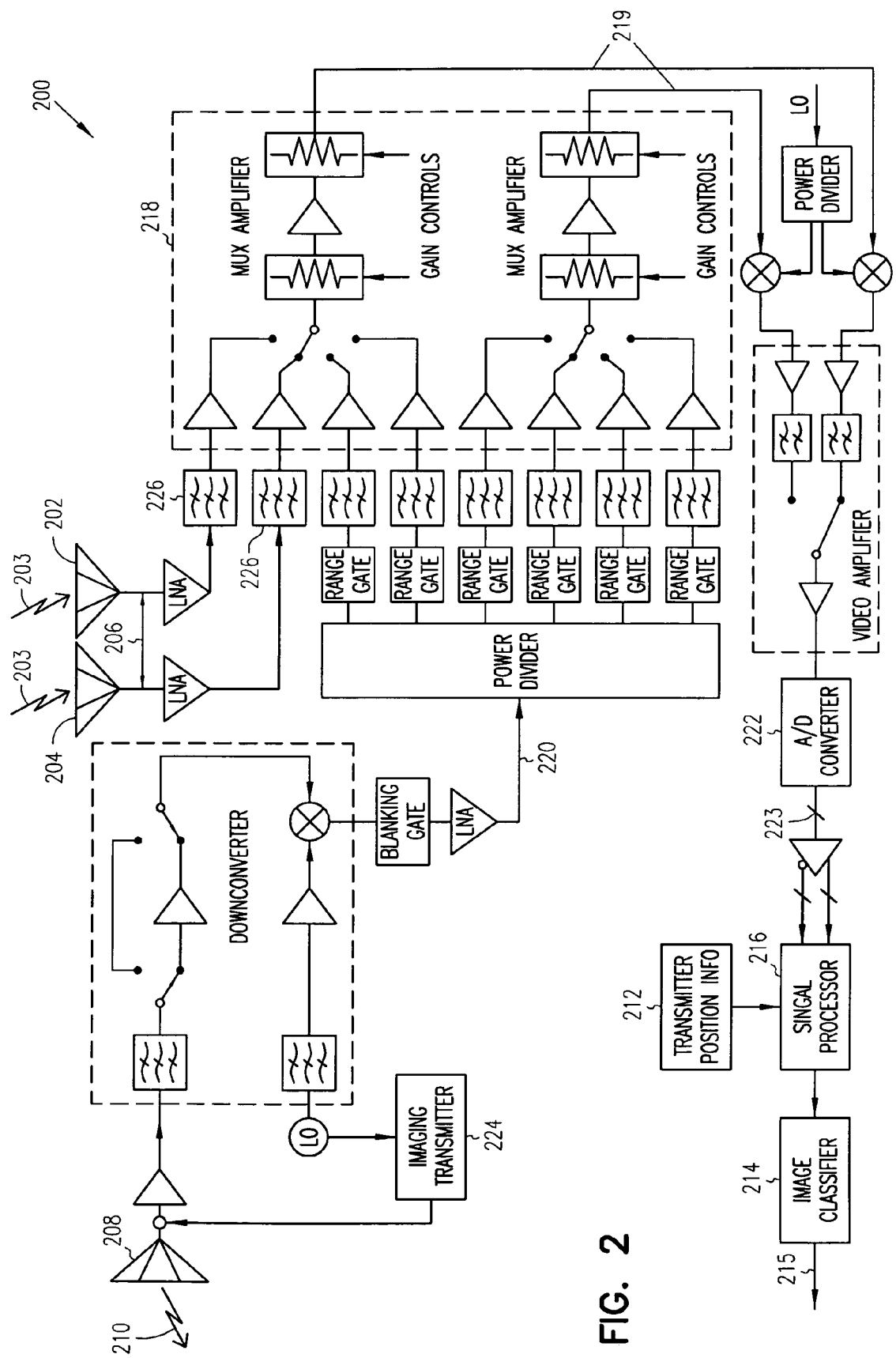
FIG. 2 is a functional block diagram of an imaging unit in accordance with some embodiments of the present invention.

FIG. 2 is a functional block diagram of an imaging unit in accordance with some embodiments of the present invention. Imaging unit 200 may be used to generate a SAR image of a target, such as target 108 (FIG. 1). Imaging unit 200 may include forward and aft positioning antennas 202 & 204 to receive at least three positioning signals 203 from different geographic locations. Imaging unit 200 may also include antenna 208 to receive return signals 210 and signal processor 212 to compensate return signals 210 for complex motion (i.e., position and orientation) of the imaging antenna 208 based on positioning signals 203. Signal processor 212 may construct a synthetic aperture image of a target from the compensated return signals as imaging unit 200 is moved with respect to the target. In FIG. 2, imaging unit 200 may correspond to imaging unit 110 (FIG. 1), return signals 210 may correspond to return signals 114 (FIG. 1), and positioning signals 203 may correspond to positioning signals 106 (FIG. 1), although the scope of the invention is not limited in this respect.

In some embodiments, imaging antenna 208 may be a radar antenna which transmits radar signals toward a target and receives return signals 210 from the target or target area. In some embodiments, imaging antenna 208 transmits and receives one or more radar frequencies selected to allow signal processor 212 to generate an image of a target through an obstacle. In some embodiments, signal processor 212 may generate an image of one or more targets through an obstacle, including one or more targets behind a structure. Obstacles, example, may include almost any opaque object or structure that may be at least partially penetrated by radar signals, such as buildings and walls, although the scope of the invention is not limited in this respect.

In some embodiments, signal processor 212 may determine the position and the orientation of antenna 208 and/or imaging unit 200 by measuring a phase of positioning signals 203 when received by forward and aft antennas 202 & 204 as imaging unit 200 is moved with respect to the target. In some embodiments, positioning signals 203 may be phase-locked and signal processor 212 may use at least three of positioning signals 203 (i.e., from at least three transmitters 102 (FIG. 1)) to determine the position and orientation of antenna 208. Positioning signals 106 may be remotely phase locked by a master/slave configuration or other phase locking technique.

In some embodiments, signal processor 212 determines the position of imaging antenna 208 based on a phase history (i.e., sum of the phase changes over time) of corresponding positioning signals 203 transmitted from the same positioning transmitter 102 (FIG. 1) received by forward and aft antennas 202 & 204 as imaging unit 200 is moved with respect to the target. Signal processor 212 may also determine the orientation of imaging antenna 208 based on phase differences between the return signals received by forward and aft antennas 202 & 204 from corresponding positioning signals 203. In some embodiments, the transmission and reception direction of imaging antenna 208 is positionally fixed with respect to forward and aft positioning antennas 202 & 204 allowing a relative pitch and yaw of imaging antenna 208 to be determined from phases of positioning signals 203 received through forward and aft positioning antennas 202 & 204. In this way, the position and orientation of imaging unit 200 can be determined as imaging unit 200 changes position and orientation with respect to a target during synthetic aperture imaging.

Referring to FIG. 1, in some embodiments, positioning signals 106 are generated by corresponding positioning transmitters 102 that are separated in azimuth. At least one of the positioning transmitters 102 (e.g., positioning transmitter 102a) is separated in elevation 116 (i.e., located at a different elevation) with respect to the other positioning transmitters 102. In some embodiments, positioning transmitters 102 may be located on or near the ground (e.g., within approximately two-hundred meters of the ground) and within approximately four-hundred meters separation in azimuth, although the scope of the invention is not limited in this respect. In some embodiments, positioning transmitters 102 may be mounted around a perimeter of an area in which unit 110 may operate.

In some embodiments, positioning signals 106 comprise substantially non-interfering signals. In some embodiments, the positioning signals may be referred to as orthogonal or substantially orthogonal signals. In some embodiments, positioning signals 106 comprise closely spaced carrier-wave (CW) tones. In these embodiments, the CW tones may be within approximately one and ten kHz of each other, although the scope of the invention is not limited in this respect. In some embodiments, positioning signals 106 may include frequencies ranging from 100 to 400 MHz, although the scope of the invention is not limited in this respect. In other embodiments, positioning signals 106 may comprise non-interfering ultra-wide band (UWB) signals, although the scope of the invention is not limited in this respect.

Return signals 114 may be radar signals that are non-interfering with positioning signals 106 and may be in different frequency ranges than positioning signals 106. In some embodiments, return signals 114 may be close in frequency to the positioning signals. In some embodiments, the radar signals transmitted and received by imaging antenna 208 (FIG. 2) are C-band signals, although other radar frequency band signals may also be suitable. In some embodiments, the radar signals may be preselected to have frequency characteristics to allow a synthetic aperture image to be generated through obstacles, providing for a see-through-the-wall capability.

In some embodiments, positioning signals 106 may comprise time-division multiplexed signals (i.e., the positioning transmitters 102 employ time diversity), code-division multiplexed signals (i.e., the positioning transmitters 102 employ code diversity) and/or frequency division multiplexed signals (i.e., the positioning transmitters 102 employ frequency diversity). In some embodiments, a combination of time diversity, frequency diversity, and/or code diversity may be employed.

In some embodiments, signal processor 212 (FIG. 2) may perform a calibration procedure to determine an initial position and orientation of imaging unit 110 with respect to positioning transmitters 102. The initial position and orientation information may be stored in storage location 216 (FIG. 2) for use by signal processor 212 (FIG. 2). The positions and orientations used during imaging may be relative positions and orientations based on the initial position and orientation. In some embodiments, absolute position and orientation are not required to compensate for the complex motion of imaging unit 110 and to perform synthetic aperture imaging. In other embodiments, imaging unit 110 may use absolute position information such as global positioning coordinates, although the scope of the invention is not limited in this respect.

Referring again to FIG. 2, in some embodiments, forward and the aft positioning antennas 202 & 204 are patch antennas, while in other embodiments, forward and the aft positioning antennas 202 & 204 may be substantially omni-directional antennas, although other antennas, such as dipole antennas, monopole antennas, loop antennas, and microstrip antennas, among others, may also be suitable. Forward and the aft positioning antennas 202 & 204 may be separated by distance 206 that may depend on the frequencies of operation as well as other system requirements. In some embodiments, forward and the aft positioning antennas 202 & 204 may be separated by a distance ranging from one-third meters to more than one meter, although the scope of the invention is not limited in this respect.

In some embodiments, imaging unit 200 may include image classifier 214 to classify the synthetic aperture image and provide image output 215 to a user. In some embodiments, image output 215 may be the generated image. The image classifier may further detect, identify and locate the image of the target either behind, through or within an obstacle, although the scope of the invention is not limited in this respect.

In some embodiments, imaging unit 200 may include multiplexing circuitry 218 to time-division multiplex/interleave positioning signals 203 received from forward and aft positioning antennas 202 & 204 with down-converted imaging/radar return signals 220. Imaging unit 200 may also include analog-to-digital (A/D) converter 222 to generate digital time-domain samples 223 from interleaved signals 219. Imaging unit 200 may also include fast Fourier transform FFT circuitry (not separately illustrated) within signal processor 212 to generate frequency domain samples/outputs from digital samples 223. Imaging unit 200 may also include signal processing circuitry within signal processor 212 to determine a phase of each positioning signal 203 (e.g., from a different positioning transmitter) based on the frequency domain samples from the FFT circuitry (e.g., for a particular positioning signal frequency). The signal processing circuitry may also track a phase change history relative to each position signal over a plurality of coherence integration dwells to determine the relative position and orientation of imaging unit 200 at almost any instant in time.

In some embodiments, signal processing circuitry of signal processor 212 may compensate for linear phase errors (i.e., slant range) and quadratic phase slope errors (i.e., for antenna position) to provide angular accuracy for constructing the synthetic aperture image with obstacles (e.g., walls) and/or at long stand off ranges (e.g., greater than 30 meters).

Imaging unit 200 may also include image generating circuitry within signal processor 212 to generate a synthetic aperture image of a target using return signals 210 compensating for the orientation and position. In some embodiments, a SAR map and/or a range-Doppler map of the target area may be generated for use in locating a target, although the scope of the invention is not limited in this respect.

Imaging unit 200 may also include imaging transmitter 224 to generate radar signals for transmission toward a target for performing the synthetic aperture imaging. Imaging unit 200 may also include narrow rouging filters 226 to process the received positioning signals (e.g., when they are closely spaced CW tones) prior to sampling. Imaging unit 200 may include other hardware and/or software elements that may normally be included in a transceiver that is not separately described or illustrated in FIG. 2.

Although unit 200 is illustrated as having several separate functional elements, one or more of the functional elements may be combined and may be implemented by combinations of software-configured elements, such as processing elements including digital signal processors (DSPs), and/or other hardware elements. For example, signal processing elements may comprise one or more microprocessors, DSPs, application specific integrated circuits (ASICs), and combinations of various hardware and logic circuitry for performing at least the functions described herein.

Figure 3:
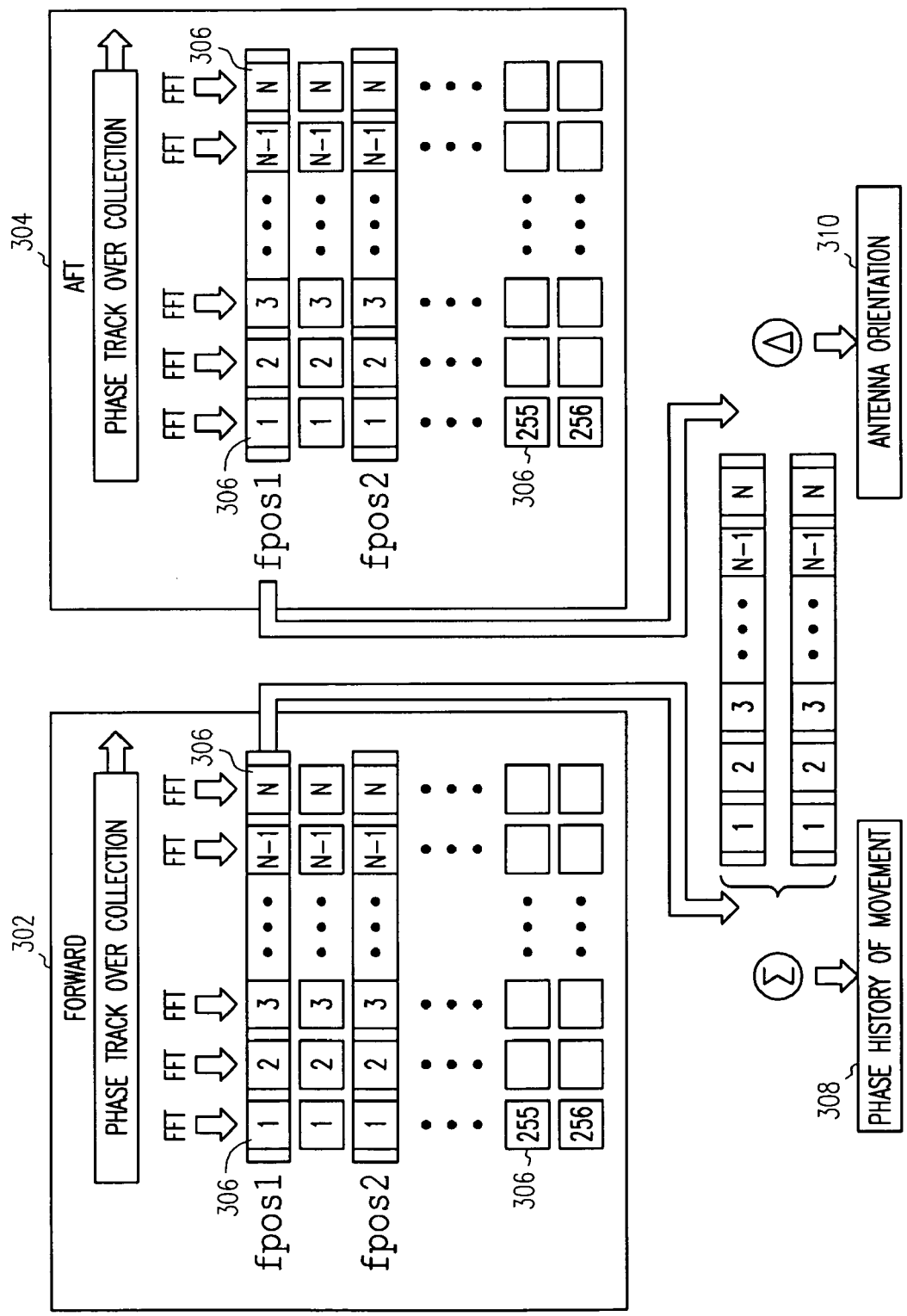
FIG. 3 illustrates determining position and orientation of an imaging unit in accordance with some embodiments of the present invention.

FIG. 3 illustrates determining position and orientation of an imaging unit in accordance with some embodiments of the present invention. Samples 306 represent frequency-domain output samples from a 256-point FFT that may be performed by the FFT circuitry of signal processor 212 (FIG. 2) on the received positioning signals. Block 302 illustrates the frequency-domain samples that are generated from the positioning signals received by forward antenna 202 (FIG. 2) and block 304 illustrates the frequency-domain samples that are generated from the positioning signals received from aft antenna 204 (FIG. 2). The horizontal direction illustrates samples taken as a function of time, which may correspond to movement of imaging unit 110 (FIG. 1). Each sample 306 may have an associated phase.

Phase history 308 for direction and distance of movement, may be determined by summing the phases of the corresponding samples from blocks 302 and 304 (i.e., from signals received through the forward and aft antennas) and may be used by signal processing circuitry of signal processor 212 (FIG. 2) to determine the relative position of imaging unit 110 (FIG. 1). Antenna orientation 310 may be determined by subtracting the phases of the corresponding samples from blocks 302 and 304 (i.e., from signals received through the forward and aft antennas) and may be used by signal processing circuitry of signal processor 212 (FIG. 2) to determine the relative orientation of imaging unit 110 (FIG. 1).

Figure 4:
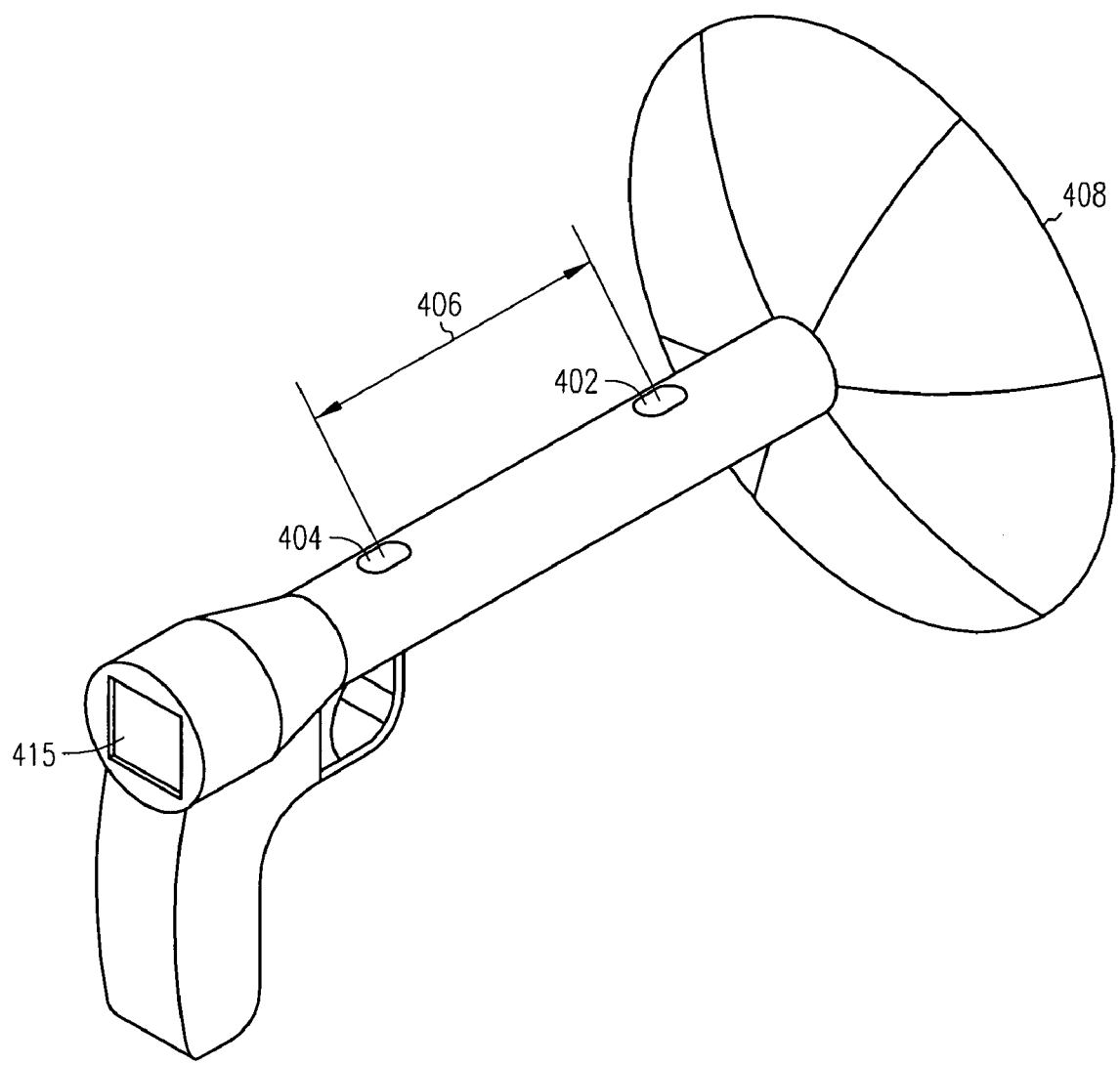
FIG. 4 illustrates a human-held imaging unit in accordance with some embodiments of the present invention.

FIG. 4 illustrates a human-held imaging unit in accordance with some embodiments of the present invention. Human-held imaging unit 400 may correspond to imaging unit 110 (FIG. 1) and may be suitable for generating a synthetic aperture image of a target from return signals received by imaging antenna 408. Positioning signals, such as positioning signals 106 (FIG. 1) may be received by forward and aft positioning antennas 402 & 404. Internal signal processing circuitry may compensate for the position and orientation of imaging antenna 408 based on phases of the received positioning signals. In FIG. 4, forward and aft positioning antennas 402 & 404 may correspond respectively to forward and aft positioning antennas 202 & 204 (FIG. 2), and may be separated by distance 406. Imaging antenna 408 may correspond to imaging antenna 208 (FIG. 2). In some embodiments, imaging unit 400 may include output 415 which may display the generated image of a target, as well as a classification for the image, although the scope of the invention is not limited in this respect.

Figure 5:
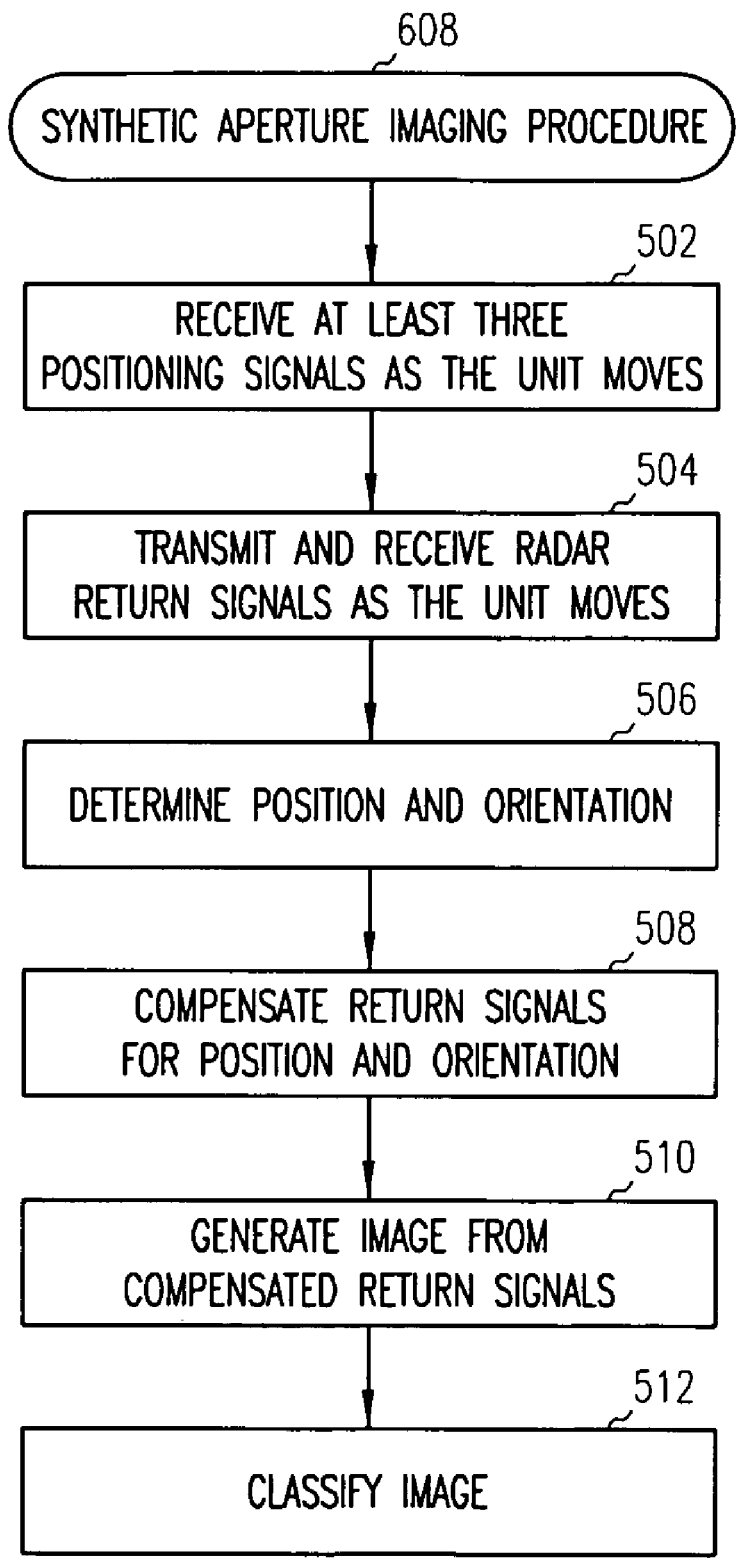
FIG. 5 is a flow chart of an imaging procedure in accordance with some embodiments of the present invention.

FIG. 5 is a flow chart of an imaging procedure in accordance with some embodiments of the present invention. Imaging procedure 500 may be used to provide imaging of one or more targets, which may be obscured by an obstacle. Imaging procedure 500 may be performed by an imaging unit, such as imaging unit 110 (FIG. 1), imaging unit 200 (FIG. 2), and/or imaging unit 400 (FIG. 4), although other units may also perform imaging procedure 500.

Operation 502 comprises receiving at least three positioning signals through forward and aft positioning antennas as the imaging unit is moved. The positioning signals may correspond to positioning signals 106 (FIG. 1) and the forward and aft positioning antennas may correspond respectively to forward and aft positioning antennas 202 & 204.

Operation 504 comprises transmitting radar signals and receiving radar return signals as the imaging unit is moved. The radar signals may be transmitted and received through an imaging antenna, such as antenna 208 (FIG. 2). In some embodiments, the frequency of the radar signals may be preselected to have characteristics to allow a synthetic aperture image to be generated through obstacles, providing for a see-through-the-wall capability.

Operation 506 comprises determining a relative position and orientation of the imaging unit from the phases of the received positioning signals. In some embodiments, phase differences may be used to determine the relative orientation, and phase sums may be used to determine relative position of the unit.

Operation 508 comprises compensating the radar return signals based on the position and orientation of the imaging unit. Each sampled radar return may be compensated for the possibly complex motion of the imaging unit.

Operation 510 comprises generating a synthetic aperture image from the compensated radar return signals. The synthetic aperture image may be generated from compensated radar return signals taken at a plurality of positions as the unit is moved with respect to the target.

Operation 512 comprises classifying the image. In some embodiments, operation 512 is optional. In some embodiments, operation 512 may comprise detecting and locating a specific target behind an obstacle. In some embodiments, operation 512 may also identify the target and/or image as part of classifying the image. In some embodiments, operation 512 comprises determining whether the target is a threat.

Although the individual operations of procedure 500 are illustrated and described as separate operations, one or more of the individual operations may be performed concurrently, and nothing requires that the operations be performed in the order illustrated. For example, operations 502 through 508 may be performed substantially simultaneously, although the scope of the invention is not limited in this respect.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices.

Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. A synthetic aperture radar imaging unit comprising:
   forward and aft positioning antennas to receive at least three positioning signals that are transmitted from different locations;
   an imaging antenna to receive radar return signals; and
   a signal processor to compensate the return signals for position and orientation of the imaging antenna using the positioning signals.

2. The imaging unit of claim 1 wherein the signal processor is to further construct a synthetic aperture radar image of a target from the compensated radar return signals as the imaging unit is moved with respect to the target.

3. The imaging unit of claim 2 wherein the imaging antenna transmits and receives one or more radar frequencies selected to allow the signal processor to generate the image of the target through an obstacle.

4. The imaging unit of claim 3 wherein the forward and the aft positioning antennas are patch antennas and have a separation distance therebetween.

5. The imaging unit of claim 4 further comprising an image classifier to classify the image and provide an image output to a user.

6. The imaging unit of claim 5 wherein the image classifier is to further detect, identify and locate the image of the target either behind, through or within the obstacle.

7. The imaging unit of claim 1 wherein the signal processor is to determine the position and the orientation of the imaging unit by measuring a phase of the positioning signals when received by the forward and aft antennas as the imaging unit is moved with respect to the target.

8. The imaging unit of claim 7 wherein when the positioning signals are phase-locked, the signal processor uses at least three of the positioning signals to determine the position and orientation of the imaging unit.

9. The imaging unit of claim 7 wherein the signal processor determines the position of the imaging unit based on a phase history of corresponding positioning signals received by the forward and aft antennas as the imaging unit is moved with respect to the target.

10. The imaging unit of claim 9 wherein the signal processor determines the orientation based on phase differences between the return signals received by the forward and aft antennas from corresponding positioning signals.

11. The imaging unit of claim 7 wherein a transmission and reception direction of the imaging antenna is positionally fixed with respect to the locations of the forward and aft positioning antennas allowing a relative pitch and yaw of the imaging antenna to be determined from phases of the positioning signals received through the forward and aft positioning antennas.

12. The imaging unit of claim 1 wherein the positioning signals are generated by corresponding positioning transmitters separate from the imaging unit, the positioning transmitters being separated from each other in azimuth, and
wherein at least one of the positioning transmitters is separated in elevation with respect to the other positioning transmitters.

13. The imaging unit of claim 12 wherein the positioning signals comprise substantially non-interfering signals.

14. The imaging unit of claim 13 wherein the positioning signals comprise carrier-wave (CW) tones.

15. The imaging unit of claim 13 wherein the positioning signals comprise at least one of time-division multiplexed signals, code-division multiplexed signals and frequency division multiplexed signals.

16. The imaging unit of claim 12 wherein the signal processor is to perform a calibration procedure to determine an initial position and orientation, and
wherein positions and orientations determined by the signal processor as the imaging unit is moved are relative positions and orientations based on the initial position and orientation.

17. The imaging unit of claim 1 further comprising:
multiplexing circuitry to multiplex the positioning signals received from the forward and aft positioning antennas with down-converted imaging return signals;
an analog-to-digital (A/D) converter to generate digital samples from the interleaved signals;
fast Fourier transform (FFT) circuitry within the signal processor to generate frequency domain samples from the digital samples;
signal processing circuitry within the signal processor to determine relative phase of each positioning signal based on the frequency domain samples to determine the position and orientation of the unit; and
image generating circuitry within the signal processor to generate a synthetic aperture radar image of a target by compensating the radar return signals for the orientation and position of the imaging unit.

18. A see-through-the-wall (STTW) synthetic aperture radar imaging system comprising:
a plurality of geographically separated positioning transmitters to transmit non-interfering positioning signals; and
a synthetic aperture radar imaging unit to generate a synthetic aperture radar image of a target based on receipt of radar return signals, wherein the imaging unit is to compensate the radar return signals for movement of the imaging unit using the positioning signals.

19. The system of claim 18 wherein the imaging unit comprises
forward and aft positioning antennas to receive at least three of the positioning signals;
an imaging antenna to receive radar return signals from the target; and
a signal processor to compensate the radar return signals for position and orientation of the imaging antenna using the positioning signals.

20. The system of claim 19 wherein the signal processor is to further construct a synthetic aperture radar image of the target from the compensated radar return signals as the imaging unit is moved with respect to the target,
wherein the imaging antenna transmits and receives one or more radar frequencies selected to allow the signal processor to generate the image of the target through an obstacle, and
wherein the signal processor is to determine the position and the orientation of the imaging unit by measuring a phase of the positioning signals when received by the forward and aft antennas as the imaging unit is moved with respect to the target.

21. The system of claim 20 wherein the positioning signals are generated by corresponding positioning transmitters that are separated in azimuth,
wherein at least one of the positioning transmitters is separated in elevation with respect to the other positioning transmitters, and
wherein the positioning signals comprise carrier-wave (CW) tones.

22. A method of synthetic aperture radar imaging a target comprising:
receiving at least three positioning signals that are separately transmitted from different locations, the positioning signals being received through forward and aft positioning antennas;
receiving radar return signals through an imaging antenna; and
compensating the return signals for position and orientation of the imaging antenna using the positioning signals.

23. The method of claim 22 further comprising constructing a synthetic aperture radar image of a target from the compensated radar return signals as the imaging antenna is moved with respect to the target.

24. The method of claim 23 further comprising transmitting and receiving one or more radar frequencies corresponding to the radar return signals with the imaging antenna, the one or more radar frequencies selected for generating the image of the target through an obstacle.

25. The method of claim 24 further comprising classifying the image and providing an image output.

26. The method of claim 25 further comprising detecting, identifying and locating the image of the target either behind, through or within the obstacle.

27. The method of claim 22 further comprising determining a relative position and orientation of the imaging antenna by measuring a phase of the positioning signals when received by the forward and aft antennas as the imaging antenna is moved with respect to the target.

28. The method of claim 27 wherein when the positioning signals are phase-locked, the method comprises using at least three of the positioning signals to determine the relative position and orientation of the imaging antenna.

29. The method of claim 27 wherein determining comprises determining the relative position of the imaging antenna based on a phase history of corresponding positioning signals received by the forward and aft antennas as the imaging antenna is moved with respect to the target.

30. The method of claim 29 wherein determining further comprises determining the orientation based on phase differences between the return signals received by the forward and aft antennas from corresponding positioning signals.

31. The method of claim 22 wherein the positioning signals are generated by corresponding positioning transmitters that are separated in azimuth, and wherein at least one of the positioning transmitters is separated in elevation with respect to the other positioning transmitters.

32. The method of claim 31 wherein the positioning signals comprise carrier-wave (CW) tones.

33. The method of claim 31 further comprising:

performing a calibration procedure to determine an initial position and orientation with respect to the positioning transmitters; and determining relative positions and orientations of the imaging antenna as the imaging antenna is moved based on the initial position and orientation.

* * * * *